US006808692B2

(12) United States Patent
Oehr

(10) Patent No.: US 6,808,692 B2
(45) Date of Patent: Oct. 26, 2004

(54) ENHANCED MERCURY CONTROL IN COAL-FIRED POWER PLANTS

(76) Inventor: Klaus H. Oehr, 1940 180 Street, Surrey, British Columbia (CA), V3S 9V2

( * ) Notice: Subject to any disclaimer, the term of this patent is extended or adjusted under 35 U.S.C. 154(b) by 64 days.

(21) Appl. No.: 10/073,986

(22) Filed: Feb. 14, 2002

(65) Prior Publication Data

US 2003/0161771 A1 Aug. 28, 2003

(51) Int. Cl.$^7$ .............................................. C01B 9/02
(52) U.S. Cl. ...................................... 423/210; 423/491
(58) Field of Search ................................. 423/210, 491

(56) References Cited

U.S. PATENT DOCUMENTS

| | | | |
|---|---|---|---|
| 4,729,882 A | 3/1988 | Ide et al. ..................... | 423/210 |
| 5,435,980 A | 7/1995 | Felsvang et al. ............ | 423/210 |
| 5,900,042 A | 5/1999 | Mendelsohn et al. ......... | 75/742 |
| 6,136,281 A | 10/2000 | Meischen et al. ........... | 423/210 |
| 6,248,217 B1 | 6/2001 | Biswas et al. ............ | 204/157.4 |
| 6,250,235 B1 | 6/2001 | Oehr et al. ................. | 110/342 |
| 6,328,939 B1 | 12/2001 | Amrhein ..................... | 423/210 |
| 6,447,740 B1 | 9/2002 | Caldwell et al. ............ | 423/210 |
| 6,582,497 B1 * | 6/2003 | Maes et al. ................. | 423/210 |
| 6,589,318 B2 * | 7/2003 | El-Shoubary et al. ....... | 423/210 |
| 6,638,485 B1 * | 10/2003 | Iida et al. ................... | 423/210 |

FOREIGN PATENT DOCUMENTS

| | | | | |
|---|---|---|---|---|
| JP | 63-100918 A * | 5/1988 | ................. | 423/210 |

OTHER PUBLICATIONS

WO 99/58228 published Nov. 18, 1999.*
Chun Wai Lee et al; "Mercury Control Research: Effects of Fly Ash and Flue Gas Parameters on Mercury Speciation", Annual Waste–to–Energy Conference, Proceedings of a Specialty Conference, 6th Miami Beach, FL, United States, May 11–13, 1998, abstract only.*
Singer, Joseph G. editor, 1991. Combustion Fossil Power. Combustion Engineering, Inc. Windsor, Connecticut: pp. 10–4 to 10–14.

www.epa.gov/region02/health/mercury.htm, Feb. 5, 2002.
www.netl.doe.gov/publications/press/2001/tl_mercuryse12.html, Feb. 5, 2002.
Galbreath, Kevin C. and Christopher Zygarlicke. 2000. "Mercury Transformations in Coal Combustion Flue Gas". Fuel Processing Technology. 65–66. 2000. pp. 289–310.
Singer, Joseph G, editor. 1991. Combustion Fossil Power. Combustion Engineering, Inc. Windsor, Connecticut.
Urano, Saburo. 1928. "Studies on Bleaching Powder, VII. The Decomposition of Calcium Hypochlorite by Heat in the Presence of Calcium Chloride". Journal of the Society of Chemical Industry of Japan. vol. 31, pp. 46–52.
Chase, M.W. et al, 1985. "JANAF Thermochemical Tables", Third Edition, Parts I and II, Journal of Physical and Chemical Reference Data, American Chemical Society and the American Institute of Physics for the Natural Bureau of Standards, vol. 14, Supplements I and II.
Senior, C.I. et al. 2000. "Gas–Phase Transformations of Mercury in Coal–Fired Power Plants". Fuel Processing Technology. 63 (2000):197–213.
Lee, Chun Wai; Kilgroe, James D.; and Ghorishi, S. Behrooz. "Mercury Control Research: Effects of Fly Ash and Flue Gas Parameters on Mercury Speciation," U.S. Environmental Protection Agency National Risk Management Research Laboratory and ARCADIS Geraghty & Miller, Inc., Research Triangle Park, NC, no date.

* cited by examiner

Primary Examiner—Wayne A. Langel
(74) Attorney, Agent, or Firm—Clifford W. Vermette; Vermette & Co.

(57) ABSTRACT

A method of treating a coal combustion flue gas, which includes injecting a molecular halogen or thermolabile molecular halogen precursor, such as calcium hypochlorite, able to decompose to form molecular halogen at flue gas temperature. The molecular halogen converts elemental mercury to mercuric halide, which is adsorbable by alkaline solids such as subbituminous or lignite coal ash, alkali fused bituminous coal ash, and dry flue gas desulphurization solids, capturable in whole or part by electrostatic precipitators (ESPs), baghouses (BHs), and fabric filters (FFs), with or without subsequent adsorption by a liquid such as a flue gas desulphurization scrubbing liquor.

18 Claims, No Drawings

ENHANCED MERCURY CONTROL IN COAL-FIRED POWER PLANTS

FIELD

The present invention relates to a method of reducing the mercury emissions for coal-fired power plants.

BACKGROUND

The United States Environmental Protection Agency (EPA) in its Utility Air Toxins Report to Congress-February 1998 concluded that "mercury from coal-fired power plants is a serious concern. Power plants account for about 52 tons of annual manmade mercury emissions in the country." The report stated that EPA has been unable to identify any currently feasible, commercially available technology for reducing these emissions. It recommends "further evaluation of potential control strategies" (see www.epa.gov/region2/health/mercury.htm).

The United States Department of Energy (DOE) indicated that it "wants to develop a wider array of mercury control options for power plants that can reliably reduce emissions by 50 to 70% by 2005 and 90% by 2010." (See www.netl.doe.gov/publications/press/2001/tl_mercurysel2.html)

A variety of previous attempts have been made to capture mercury.

Ide et al describe the conversion of mercury into mercuric chloride via addition of acidic chlorine containing material, especially hydrogen chloride, into mercury-containing gaseous emissions (see Ide, Akiro et al. 1988. "Process for Cleaning Mercury-Containing Gaseous Emissions". U.S. Pat. No. 4,729,882). This mercury removal technique requires massive hydrogen chloride injection into mercury containing flue gas, at HCl levels of 500 to 1500 ppm, which would result in excessive corrosion of coal fired power plant steel components. Furthermore, combination of this technique with subsequent hydrogen chloride/mercuric chloride containing flue gas in a wet flue gas desulphurization system (FGD) containing alkali for purposes of sulphur dioxide adsorption from flue gas as a sulphite, bisulphate, bisulphate, or sulphate would result in unacceptable consumption of alkali scrubbing chemicals by the adsorbed hydrogen chloride. Therefore, this technique for mercury control is not believed to be commercially viable in coal-fired power plants.

Felsvang et al describe mercury absorption between 110–170° C. in the presence of chlorides, especially hydrogen chloride and alkaline "basic absorbent" introduced as an aqueous aerosol suspension (Felsvang, K et al. 1995. "Method for Improving the Hg-Removing Capability of a Flue Gas Cleaning Process". U.S. Pat. No. 5,435,980). This technique requires the use of substantial expensive capital equipment foreign to conventional coal fired power plants. It does not utilize existing flue gas desulphurization equipment. Furthermore, alkaline sorbent designed to remove mercuric chloride is partially wasted by hydrogen chloride unreacted with mercury. Finally, its excessive use of hydrogen chloride, especially at 110–170° is certain to cause highly undesirable corrosion of steel containing surfaces in coal-fired power plants to iron chlorides.

Meichen and Pelt al describe the use of precious metals, especially gold, to catalytically convert elemental mercury $Hg°$ to mercuric chloride $HgCl_2$ in flue gas (Meischen, S. and J. Van Pelt. 2000. "Method to Control Mercury Emissions from Exhaust Gases". U.S. Pat. No. 6,136,281). This process is limited to oxidation of mercury to mercuric chloride in flue gas below 300° C. due to undesirable loss of gold as volatile gold trichloride. This technique requires the use of substantial expensive capital equipment foreign to conventional coal fired power plants plus the use of very expensive precious metal catalysts.

Biswas and Wu describe the irradiation of solid particles with light, especially ultraviolet light, to induce catalytic photo-oxidation of mercury to forms capable of being adsorbed by solid particles (Biswas, P. and C. Wu. 2001. "Process for the Enhanced Capture of Heavy Metal Emissions". U.S. Pat. No. 6,248,217). Unfortunately, this technique requires the use of substantial expensive capital equipment foreign to conventional coal fired power plants plus the use of consumable metal catalysts.

Amrhein describes the use of existing wet flue gas desulphurization systems to capture oxidized mercury in a manner which inhibits undesirable partial conversion of adsorbed oxidized mercury back to volatile elemental mercury (Amrhein, Gerald T. 2001. "Mercury Removal in Utility Wet Scrubber Using a Chelating Agent". U.S. Pat. No. 6,328,939). The disadvantage of this method is that it requires effective but expensive chelating agents with potential problems due to chelation of scrubber metal components with chelates.

Previous publications have indicated that alkaline fly ash containing solids have an affinity for mercury capture. For instance, Galbreath and Zygarlicke have shown that subbituminous coal ash can capture a portion of mercury in a flue gas (Galbreath, Kevin C. and Christopher Zygarlicke. 2000. "Mercury Transformations in Coal Combustion Flue Gas". Fuel Processing Technology. 65–66, pages 289–310, @ page 304). They also indicated that hydrogen chloride spiking of flue gas inhibited mercury capture by alkaline solids, such as calcium hydroxide or alkaline fly ash by neutralizing the alkaline sites able to complex mercury, especially oxidized mercury. U.S. Pat. No. 6,250,235 issued to Oehr and Yao describes the addition of a fossil fuel and additive in a combustion zone to achieve the following results alone or in combination: accelerated combustion, desulphurization, nitrogen oxides emission reduction, pozzolanic or cementitious products production or combustor anti-fouling (Oehr, Klaus H. and Felix Z. Yao. 2001. "Method and Product for Improved Fossil Fuel Combustion". U.S. Pat. No. 6,250,235). This is achieved by fusing alkali, such as calcium oxide, to coal ash and sulphur, while the coal is burning, via a flux. Full scale testing of this patented method, using bituminous coal in a 100 megawatt power plant, resulted in 45% reduction of mercury emissions as compared to testing without the use of above fuel additive. X-ray analysis of the resulting fly ash indicated that the normally acidic bituminous fly ash had been converted to an alkaline form containing alkaline cementitious crystals not unlike those found in subbituminous or lignite based fly ash as well as containing small amounts of alkaline calcium oxide and calcium hydroxide.

It is also well known that elemental mercury ($Hg°$) can be absorbed by activated carbon. Adsorption improves as the temperature of the carbon is reduced or if the carbon is impregnated with halogen species, such as iodine or chlorides and/or sulphides. Unfortunately the use of activated carbon requires extremely high carbon to mercury ratios e.g. 3000–100,000 to 1 carbon to mercury weight ratios. Injection of activated carbon into the cool zones of coal combustors ahead of the ESPs, FFs or BHs, results in unacceptable contamination of coal ash with carbon for purposes of ash recycling into cement/concrete applications.

Finally, previous publications have described the capture of mercury by scrubbing solutions containing oxidants. For instance Mendelsohn describes contacting elemental mercury containing flue gas with oxidizing solutions of halogens to effect mercury capture as a mercuric halide (Mendelsohn, M. H. 1999. "Method for the Removal of Elemental Mercury from a Gas Stream". U.S. Pat. No. 5,900,042). This technique is not believed to be commercially viable for any or all of the following reasons:

Mercury capture is inadequate. A maximum of 71.1% and 69.6% mercury removal was demonstrated for bromine and chlorine containing solutions respectively.

Halogen reagents are wasted due to the undesirable consumption of halogen oxidant by sulphur dioxide in the flue gas.

Mercury capture does not utilize existing capital equipment including ESPs, FFs, BHs or FGDs. Expensive additional capital equipment is required. Addition of "bubblers" or liquid scrubbers into a coal-fired power plant would substantially increase pressure drops through the system thereby increasing equipment sizing requirements (e.g. air blowers). This would increase both capital and operating costs for the operation of air blowers.

Mercury capture, with the least expensive chlorine containing solutions, is reduced in the absence of nitric oxide. Clearly NOx removal by technology upstream of the bubbler such as selective catalytic reduction (SCR) or selective non-catalytic reduction (SNCR) would dramatically reduce mercury removal further.

Previous systems for mercury control have been underutilized systems such as electrostatic precipitators (ESPs), wet flue gas desulphurization systems (FGDs), fabric filters (FFs) and baghouses (BHs) for mercury control. Such systems have suffered from a variety of mercury control related problems such as the following:

Injection of excessive levels of acid hydrogen chloride into real or simulated coal combustion flue gas resulting in destruction of alkaline solids able to capture mercury, especially oxidized mercury species such as mercuric chloride, and potential corrosion of metal surfaces such as steel surfaces found in power plants.

Use of excessive levels of expensive supplementary capital equipment and/or chemicals including wet scrubbers, photocatalysts, ultraviolet light generators, precious metals, activated carbon, chelates etc.

Inadequate conversion of mercury to forms, such as mercuric halides for example mercuric chloride, adsorbable by alkaline solids such as alkaline fly ash or alkali fused acidic fly ash to render it alkaline (e.g. bituminous coal fly ash).

SUMMARY OF THE CURRENT INVENTION

The current invention relates to the enhanced capture of mercury in coal combustion systems via enhanced conversion of mercury to mercuric halide species adsorbable by alkaline solids such as fly ash, alkali fused acidic ash (e.g. bituminous ash), dry FGD solids such as calcium oxide, calcium hydroxide or calcium carbonate in ESPs, FFs or BHs in the presence or absence of liquids such as wet FGD scrubber solutions. The current invention further relates to producing mercury containing fly ash, suitable for use in cementitious applications, thereby eliminating undesirable discharge of mercury to landfills from a fly ash source.

According to the invention, there is provided a method of treating coal combustion flue gas, preferably that obtained after the "superheater" section of a coal-fired plant, for example the economizer inlet (Singer, Joseph G editor. 1991. Combustion Fossil Power. Combustion Engineering, Inc. Windsor, Conn., page 5–10), with a source of molecular halogen, such as chlorine gas or a thermolabile alkali metal hypohalite, for example calcium hypochlorite solution able to convert mercury rapidly to mercuric chloride, easily adsorbable by alkaline solids such as subbituminous fly ash, lignite fly ash, alkali fused bituminous fly ash or alkaline dry FGD solids capturable by ESPs, FFs, BHs alone or ahead of a liquid such as a wet FGD scrubbing liquor.

Either molecular halogen such as chlorine gas, and/or bromine gas and/or iodine can be injected, or a molecular halogen precursor such as calcium hypochlorite can be injected into the flue gas. Molecular halogen precursors such as calcium hypochlorite can be used as a whole or partial source of the alkaline solids desirable for oxidized mercury adsorption, e.g. mercuric halide such as mercuric chloride. Molecular halogen precursors containing calcium are particularly desirable in cases where the fly ash or alkali fused fly ash is intended to be used for cementitious applications e.g. in concrete or blended cements.

DETAILED DESCRIPTION

Molecular halogen sources such as chlorine gas, bromine gas or iodine can be used alone or in combination with molecular halogen precursors. Due to cost, chlorine gas is a preferred molecular halogen source.

Non-limiting examples of thermolabile halogen species, able to decompose thermally at flue gas temperatures, typical of coal-fired power plants, are shown in table 1 below:

TABLE 1

| Thermolabile Halogen Precursor | Decomposition Temperature ° C. | Reference |
|---|---|---|
| Calcium hypochlorite | 100 | 12 page 3.23 |
| Magnesium bromide | 165 | 13 page 969 |
| Potassium tri-iodide | 225 | 13 page 1320 |

Urano describes the thermal decomposition of calcium hypochlorite $Ca(OCl)_2$ quantitatively (Urano, Saburo. 1928. "Studies on Bleaching Powder, VII. The Decomposition of Calcium Hypochlorite by Heat in the Presence of Calcium Chloride". Journal of the Society of Chemical Industry of Japan. Volume 31, pages 46–52). He analyzed the products (in solid and gaseous states) after heating mixtures of calcium hypochlorite and calcium chloride $CaCl_2$. The decomposition of calcium hypochlorite in the presence of sufficient calcium chloride was chiefly according to the following reaction:

$$Ca(OCl)_2 + CaCl_2 = 2CaO + 2Cl_2 \quad (1)$$

and partly to:

$$Ca(OCl)_2 = CaCl_2 + O_2 \quad (2)$$

The evolution of chlorine was caused by the mutual reaction of calcium hypochlorite with calcium chloride. Molecular bromine can be generated by thermal decomposition of a dehydrated bromide salt solution in the presence of oxygen, for example magnesium bromide solution. Molecular iodine can be generated by thermal decomposition of a dehydrated iodide containing salt solution such as a potassium tri-iodide solution.

The conversion of mercury to its mercuric halide forms is thermodynamically favoured at temperatures typical of coal combustor flue gas, especially coal combustor flue gas between economizer inlets and ESPs, FGDs, BHs or FFs, as indicated by the negative values for the free energy of formation of mercuric halides, from elemental mercury and molecular halogen, in kilojoules/mole as a function of Celsius temperature as shown in the table 2 below, (Chase, M. W. et al. 1985. "JANAF Thermochemical Tables", third edition, Parts I and II, Journal of Physical and Chemical Reference Data, American Chemical Society and the American Institute of Physics for the Natural Bureau of Standards, Volume 14, Supplements I and II):

TABLE 2

|  | 127° C. | 227° C. | 327° C. | 427° C. | 527° C. |
|---|---|---|---|---|---|
| Mercuric bromide | −140 | −126 | −111 | −91 | −68 |
| Mercuric chloride | −169 | −148 | −137 | −120 | −101 |
| Mercuric iodide | −101 | −92 | −81 | −58 | −35 |

The larger the negative free energy of formation, the more likely the reaction is to proceed. Clearly from table 2, it can be seen that the formation of mercuric chloride from elemental mercury and molecular chlorine is particularly favoured between 127 and 527° C. typical of post-superheater coal combustor flue gas zones. This is fortunate, because the costs of molecular chlorine and molecular chlorine precursors, is lower than their bromine or iodine counterparts.

The following examples illustrate the flexibility of the current invention and a rational, non-limiting basis for controlling mercury emissions via enhanced conversion of mercury to alkali adsorbable mercuric halide, especially mercuric chloride.

EXAMPLE 1

Enhancement of Mercury Capture by Subbituminous Coal Fly Ash

Senior et al have estimated a rate constant k for the $Hg°+Cl_2=HgCl_2$ reaction of $1.07*10^{-15}$ $cm^3$ $molecule^{-1}$ $second^{-1}$ at 500° C. for an isothermal plug flow reactor (Senior, C. I. et al. 2000. "Gas-Phase Transformations of Mercury in Coal-Fired Power Plants". Fuel Processing Technology. 63:197–213). The room temperature rate for the same reaction is estimated at $4*10^{-15}$ $cm^3$ $molecule^{-1}$ $second^{-1}$. The activation energy for the reaction was estimated at 3.7 kilojoules/mole.

Galbreath and Zarlicke describe mercury species derived from combustion of subbituminous Absaloka PRB coal (see Galbreath et al., supra). This coal had 50±10 ppm chloride and 0.052±0.005 ppm mercury content with 0.57% sulphur. Absaloka coal combustion flue gas composition was 410 ppmv $SO_2$, 960 ppmv $NO_x$ and 3 ppmv HCl. Baseline flue gas mercury emissions for this coal in $\mu g/m^3$ were 2.28 Hg°, 1.06 $HgX_2$ (includes mercuric chloride), 2.26 Hg particulate and 5.53 mercury total. 100 ppmv HCl spiking of Absaloka coal combustion flue gas resulted in 1.21 $HgX_2$. Senior et al have provided correlations between chloride content of coal, HCl and $Cl_2$ emissions during coal combustion Senior et al., supra. Typically, 1% of the HCl injected converts to $Cl_2$, which means 0.5 ppmv $Cl_2$ would create 0.15 $\mu g/m^3$ $HgCl_2$. Table 3 below illustrates mercury emissions from subbituminous Absaloka coal (Galbreath, supra.). The upper part of the table shows measured mercury emissions derived from combustion of the coal. The bottom part of the table estimates elemental mercury conversion to mercuric chloride using 5 ppmv molecular chlorine injection into flue gas starting at 500° C. Of particular interest is the fact that 40% of the total mercury emission is unoxidized i.e. elemental mercury (2.21/5.53=40%) in the absence of the molecular chlorine spike. Reaction rate k is derived from data discussed previously (see Senior et al., supra.). Note that elemental mercury is estimated at only 2.9% Of the baseline case (0.16/5.53=2.9%). Spiking of the flue gas of this subbituminous coal combustion, even at the low molecular chlorine level of 5 ppmv, results in substantial conversion of elemental mercury into the highly desirable, easily adsorbable, mercuric chloride form. Use of a thermolabile molecular chlorine precursor such as a solution of calcium hypochlorite and calcium chloride, able to generate alkaline solids such as calcium oxide CaO, enhances mercury capture in ESPs, FFs and BHs, for all of the reasons cited previously. Clearly, this method of mercury oxidation via molecular halogen sources, such as thermolabile calcium hypochlorite/calcium chloride aqueous mixtures, can be adjusted in numerous advantageous ways e.g. by varying (i) droplet size during injection into flue gas, (ii) concentration of thermolabile species, (iii) dosing level, etc. This technique complements current mercury capturing devices, having an alkaline subbituminous fly ash, including ESPs, FFs or BHs.

TABLE 3

| Absaloka PRB | Baseline | | | | | |
|---|---|---|---|---|---|---|
| Hg total $\mu g/m^3$ | 5.53 | | | | | |
| Hg as $HgX_2$ $\mu g/m^3$ | 1.06 | | | | | |
| Hg as particulate $\mu g/m^3$ | 2.26 | | | | | |
| Hg° $\mu g/m^3$ | 2.21 | | | | | |
| % Hg elemental | 40.0% | | | | | |
|  | With $Cl_2$ spike | | | | | |
| Absaloka PRB | At 5 ppmv | | | | | |
| Hg total $\mu g/m^3$ | 5.53 | | | | | |
| Hg as HgX2 $\mu g/m^3$ | 3.11 | | | | | |
| Hg as particulate $\mu g/m^3$ | 2.26 | | | | | |
| Hg° $\mu g/m^3$ | 0.16 | | | | | |
| % Hg elemental | 2.9% | | | | | |
| Ppm Hg total in coal | 0.052 | | | | | |
| Time seconds | ° F. | ° C. | ° K. | Hg° initial molecules/$cm^3$ | $Cl_2$ initial molecules/$cm^3$ | Hg° reacted molecules/$cm^3$ | % Hg° reacted |

TABLE 3-continued

| | | | | | | | | |
|---|---|---|---|---|---|---|---|---|
| 0.000 | 1000 | 538 | 811 | 1.09E−15 | 6.63E+09 | 1.34E+14 | | |
| 0.100 | 964 | 518 | 791 | 1.08E−15 | 5.66E+09 | 1.34E+14 | 9.75E+08 | 15% |
| 0.200 | 928 | 498 | 771 | 1.06E−15 | 4.84E+09 | 1.34E+14 | 8.20E+08 | 27% |
| 0.300 | 892 | 478 | 751 | 1.05E−15 | 4.15E+09 | 1.34E+14 | 6.91E+08 | 37% |
| 0.400 | 856 | 458 | 731 | 1.03E−15 | 3.56E+09 | 1.34E+14 | 5.83E+08 | 46% |
| 0.500 | 820 | 438 | 711 | 1.01E−15 | 3.07E+09 | 1.34E+14 | 4.93E+08 | 54% |
| 0.600 | 784 | 418 | 691 | 9.95E−16 | 2.65E+09 | 1.34E+14 | 4.18E+08 | 60% |
| 0.700 | 748 | 398 | 671 | 9.76E−16 | 2.30E+09 | 1.34E+14 | 3.54E+08 | 65% |
| 0.800 | 712 | 378 | 651 | 9.56E−16 | 2.00E+09 | 1.34E+14 | 3.01E+08 | 70% |
| 0.900 | 676 | 358 | 631 | 9.35E−16 | 1.74E+09 | 1.34E+14 | 2.56E+08 | 74% |
| 1.000 | 640 | 338 | 611 | 9.14E−16 | 1.52E+09 | 1.34E+14 | 2.19E+08 | 77% |
| 1.100 | 604 | 318 | 591 | 8.92E−16 | 1.33E+09 | 1.34E+14 | 1.87E+08 | 80% |
| 1.200 | 568 | 298 | 571 | 8.69E−16 | 1.17E+09 | 1.34E+14 | 1.60E+08 | 82% |
| 1.300 | 532 | 278 | 551 | 8.44E−16 | 1.04E+09 | 1.34E+14 | 1.37E+08 | 84% |
| 1.400 | 496 | 258 | 531 | 8.19E−16 | 9.20E+08 | 1.34E+14 | 1.18E+08 | 86% |
| 1.500 | 460 | 238 | 511 | 7.93E−16 | 8.18E+08 | 1.34E+14 | 1.01E+08 | 88% |
| 1.600 | 424 | 218 | 491 | 7.65E−16 | 7.31E+08 | 1.34E+14 | 8.72E+07 | 89% |
| 1.700 | 388 | 198 | 471 | 7.36E−16 | 6.56E+08 | 1.34E+14 | 7.52E+07 | 90% |
| 1.800 | 352 | 178 | 451 | 7.06E−16 | 5.91E+08 | 1.34E+14 | 6.49E+07 | 91% |
| 1.900 | 316 | 158 | 431 | 6.74E−16 | 5.35E+08 | 1.34E+14 | 5.61E+07 | 92% |
| 2.000 | 280 | 138 | 411 | 6.41E−16 | 4.87E+08 | 1.34E+14 | 4.85E+07 | 93% |

EXAMPLE 2

Enhancement of Mercury Capture by a Cementitious Fly Ash Derived from Fusion of Alkali with Bituminous Coal Ash During Combustion Table 4 below illustrates mercury emissions in lbs/hour as measured after an ESP, in a bituminous coal-fired combustor, with and without the addition of lime plus a lime flux as described in U.S. Pat. No. 6,250,235 (Oehr et al.). In this case the "additive" to coal ash ratio ranged from 0.81–0.85. Lime and flux represented 91% and 9% respectively of the additive formula. X-ray diffraction analysis of the fly ash resulting from the use of the "additive" indicated that the fly ash was cementitious and alkaline.

TABLE 4

Average Mercury Emissions by type with and without the Additive in lbs/hour

| | Particulate | Oxidized | Elemental | Total |
|---|---|---|---|---|
| Baseline Average | 3.15E−05 | 2.13E−03 | 3.93E−03 | 6.28E−03 |
| % Mercury by type | 1 | 34 | 63 | 100 |
| Additive/Ash 0.81–0.85 | 1.55E−05 | 5.72E−04 | 2.86E−03 | 3.45E−03 |
| % Mercury by type | 0 | 17 | 83 | 100 |
| % Mercury drop due to Additive | 51 | 73 | 28 | 45 |

The results in the above table indicate two key factors:

The cementitious alkaline fly ash resulting from the use of the additive is a good sorbent for oxidized mercury, because oxidized mercury emissions were reduced by (2.13−0.57)/2.13=73% due to use of the additive.

The flue gas lacked sufficient molecular halogen to effect substantial oxidation of elemental mercury (i.e. only 28% drop from baseline case).

It is certain that injection of a molecular halogen source, such as calcium hypochlorite/calcium chloride aerosol or chlorine gas, at an appropriate dose, in the economizer/ESP section of this combustor, in similar fashion to Example 1, would effect substantial conversion of elemental mercury to easily adsorbable mercuric halide such as mercuric chloride. For instance, a 97.6% reduction in elemental mercury via its conversion to adsorbable mercuric chloride, in similar fashion to Example 1, without a corresponding increase in particulate and oxidized mercury would result in the following levels of mercury control vs. the baseline case shown in Table 5 below:

TABLE 5

Average Mercury Emissions by type with and without the Additive in lbs/hour

| | Particulate | Oxidized | Elemental | Total |
|---|---|---|---|---|
| Baseline Average | 3.15E−05 | 2.13E−03 | 3.93E−03 | 6.28E−03 |
| % Mercury by type | 1 | 34 | 63 | 100 |
| Additive/Ash 0.81–0.85 | 1.55E−05 | 5.72E−04 | 6.86E−05 | 6.56E−04 |
| % Mercury by type | 2 | 87 | 10 | 100 |
| % Mercury drop due to Additive | 51 | 73 | 98 | 90 |

This 90% reduction in mercury emissions would satisfy EPA requirements without destroying the fly ash recyclability, caused by inappropriate injection of a sorbent such as activated carbon. The value of the U.S. Pat. No. 6,250,235 invention is clearly enhanced via the current invention. The technique described in the current example could also be applied ahead of other solids collection devices such as FFs and BHs.

EXAMPLE 3

Enhancement of Mercury Capture from Bituminous Coal Combustion by FGDs

A Canadian power plant burning high sulphur United States bituminous coal and equipped with a wet FGD reported the following mercury emissions at the ESP outlet and wet FGD outlet in $\mu g/m^3$ shown in Table 6 below.

TABLE 6

| Bituminous Coal | Baseline ESP outlet | Baseline FGD outlet |
|---|---|---|
| Hg total $\mu g/m^3$ | 5.40 | 2.00 |
| Hg as $HgX_2$ $\mu g/m^3$ | 4.06 | 0.54 |
| Hg as particulate $\mu g/m^3$ | 0.03 | 0.01 |
| $Hg°$ $\mu g/m^3$ | 1.05 | 1.45 |
| % Hg removal via FGD | | 63% |
| % $HgX_2$ removal via FGD | | 87% |

The data indicates that the FGD reduced mercury emissions 63% versus the ESP alone and reduced oxidized mercury emissions by 87%. Data indicates that (1.45−1.05)/4.06= 10% of oxidized mercuy input to the FGD was reconverted to elemental mercury. using a similar 5 ppmv molecular $Cl_2$ spike as in analogous fashion to Example 1 above results in the following simulation shown in Table 7 below:

TABLE 7

| Bituminous Coal | Simulated ESP outlet | Simulated FGD outlet |
|---|---|---|
| Hg total $\mu g/m^3$ | 5.40 | 1.24 |
| Hg as $HgX_2$ $\mu g/m^3$ | 5.03 | 0.65 |
| Hg as particulate $\mu g/m^3$ | 0.03 | 0.01 |
| Hg° $\mu g/m^3$ | 0.08 | 0.58* |
| % Hg removal via FGD |  | 77% |
| % $HgX_2$ removal via FGD |  | 87% |

*assumes 10% of oxidized mercury input to FGD reconverted to elemental mercury.

If elemental mercury formation inside the FGD is prevented using previous methods (e.g. Amrhein, Gerald et al.) then emissions are as shown in Table 8 below:

TABLE 8

| Bituminous Coal | Simulated ESP outlet | Simulated FGD outlet |
|---|---|---|
| Hg total $\mu g/m^3$ | 5.40 | 0.74 |
| Hg as $HgX_2$ $\mu g/m^3$ | 5.03 | 0.65 |
| Hg as particulate $\mu g/m^3$ | 0.03 | 0.01 |
| Hg° $\mu g/m^3$ | 0.08 | 0.08* |
| % Hg removal via FGD |  | 86% |
| % $HgX_2$ removal via FGD |  | 87% |

*assumes 100% inhibition of oxidized mercury conversion to elemental mercury.

Note that the techniques described above might be used in combination, to further enhance performance. For instance, the lime+flux ash fusion additive described in Example 2 above could be combined with the FGD system in Example 3 above plus the molecular halogen or thermolabile molecular halogen precursor of the current invention. This particular combination should easily achieve the 90% EPA mercury reduction requirement by trapping oxidized mercury in an alkaline fly ash thereby reducing oxidized mercury input to the FGD along with subsequent elemental mercury release. Alternatively, a small amount of subbituminous or lignite coal also capable of creating alkaline fly ash could be blended with bituminous coal to increase oxidized mercury capture in the ESP and subsequently reduce elemental mercury discharge from the FGD with or without techniques such as those described Amrheim, supra.

The above examples show that it is possible to achieve dramatic mercury emission reduction, through appropriate use of conventional installed equipment and techniques in combination with the teachings of the current invention. The above 3 examples are believed capable of achieving highly desirable conversion of elemental mercury to a mercuric halide, especially mercuric chloride, easily captured by existing pollution control devices including ESPs, BHs, FFs and wet or dry FGDs burning a variety of coals.

The above techniques can be used alone or supplemented with other techniques to enhance mercury capture in a cost effective way that eliminates undesirable contamination of fly ash with debris (e.g. activated carbon) rendering it unsuitable for recycling in cementitious applications.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

REFERENCES 1. www.epa.gov/region2/health/mercury.htm
2. www.netl.doe.gov/publications/press/2001/tl_mercurysel2.html
3. Ide, Akiro et al. 1988. "Process for Cleaning Mercury-Containing Gaseous Emissions". U.S. Pat. No. 4,729,882. March 8.
4. Felsvang, K et al. 1995. "Method for Improving the Hg-Removing Capability of a Flue Gas Cleaning Process". U.S. Pat. No. 5,435,980. July 25.
5. Meischen, S. and J. Van Pelt. 2000. "Method to Control Mercury Emissions from Exhaust Gases". U.S. Pat. No. 6,136,281. October 24.
6. Biswas, P. and C. Wu. 2001. "Process for the Enhanced Capture of Heavy Metal Emissions". U.S. Pat. No. 6,248,217. June 19.
7. Amrhein, Gerald T. 2001. "Mercury Removal in Utility Wet Scrubber Using a Chelating Agent". U.S. Pat. No. 6,328,939. December 11.
8. Galbreath, Kevin C. and Christopher Zygarlicke. 2000. "Mercury Transformations in Coal Combustion Flue Gas". Fuel Processing Technology. 65–66. pages 289–310.
9. Oehr, Klaus H. and Felix Z. Yao. 2001. "Method and Product for Improved Fossil Fuel Combustion". U.S. Pat. No. 6,250,235. June 26.
10. Mendelsohn, M. H. 1999. "Method for the Removal of Elemental Mercury from a Gas Stream". U.S. Pat. No. 5,900,042. May 4.
11. Singer, Joseph G editor. 1991. Combustion Fossil Power. Combustion Engineering, Inc. Windsor, Conn.
12. Dean, John A. 1992. Lange's Handbook of Chemistry. McGraw-Hill, Inc. (New York)
13. The Merck Index. 1996. Twelfth Edition. Merck & Co. (New Jersey)
14. Urano, Saburo. 1928. "Studies on Bleaching Powder, VII. The Decomposition of Calcium Hypochlorite by Heat in the Presence of Calcium Chloride". Journal of the Society of Chemical Industry of Japan. Volume 31, pages 46–52.
15. Chase, M. W. et al. 1985. "JANAF Thermochemical Tables", Third Edition, Parts I and II, Journal of Physical and Chemical Reference Data, American Chemical Society and the American Institute of Physics for the Natural Bureau of Standards, Volume 14, Supplements I and II.
16. Senior, C. I. et al. 2000. "Gas-Phase Transformations of Mercury in Coal-Fired Power Plants". Fuel Processing Technology. 63:197–213.

I claim:

1. A method of treating coal combustion flue gas containing mercury, comprising:
   injecting a member selected from the group consisting of molecular halogen and a thermolabile molecular halogen precursor into said flue gas to effect oxidation of elemental mercury to a mercuric halide and providing alkaline solid particles in said flue gas ahead of a particulate collection device, in order to adsorb at least a portion of said mercuric halide.

2. The method as claimed in claim 1, wherein said molecular halogen and/or thermolabile molecular halogen precursor contains a member selected from the group consisting of chlorine, bromine and iodine.

3. The method as claimed in claim 2, wherein said thermolabile molecular halogen precursor contains a hypohalite.

4. The method as claimed in claim 3, wherein said hypohalite is a hypochlorite.

5. The method as claimed in claim 4, wherein said hypochlorite is calcium hypochlorite.

6. The method as claimed in claim 5, wherein the calcium hypochlorite is in aqueous solution.

7. The method as claimed in claim 6, wherein calcium chloride is a component of the calcium hypochlorite containing solution.

8. A method as claimed in claim 1, wherein the alkaline solid particles are alkaline coal fly ash particles.

9. A method as claimed in claim 8, wherein the coal fly ash particles are those derived from combustion of subbituminous or lignite coal.

10. A method as claimed in claim 1, wherein the alkaline solid particles are those derived from the fusion of coal ash with alkali and an alkali flux.

11. A method as claimed in claim 1, wherein the alkaline solid particles are those derived from the decomposition of a thermolabile halogen precursor.

12. A method as claimed in claim 1, wherein the alkaline solid particles are those derived from flue gas desulphurization solids.

13. The method as claimed in claim 1, wherein said particulate matter collection device is an electrostatic precipitator.

14. The method as claimed in claim 1, wherein said particulate matter collection device is a baghouse.

15. The method as claimed in claim 1, wherein said particulate matter collection device is a fabric filter.

16. The method as claimed in claim 1, wherein the resulting treated flue gas having had particulate matter removed is passed through a flue gas desulphurization system (FGD) containing a liquid.

17. The method as claimed in claim 11, wherein the alkaline particles contain lime.

18. The method as claimed in claim 1, wherein the mercuric halide containing alkaline solid particles are suitable for use in cementitious products.

* * * * *

INTER PARTES REEXAMINATION CERTIFICATE (852nd)
United States Patent
Oehr

(10) Number: US 6,808,692 C1
(45) Certificate Issued: Apr. 7, 2014

(54) ENHANCED MERCURY CONTROL IN COAL-FIRED POWER PLANTS

(75) Inventor: Klaus H. Oehr, Surrey (CA)

(73) Assignee: Hazelmere Research Ltd., Surrey, British Columbia

Reexamination Request:
No. 95/001,368, May 28, 2010

Reexamination Certificate for:
Patent No.: 6,808,692
Issued: Oct. 26, 2004
Appl. No.: 10/073,986
Filed: Feb. 14, 2002

(51) Int. Cl.
*B01D 53/64* (2006.01)
*B01D 53/46* (2006.01)

(52) U.S. Cl.
USPC .......................................... 423/210; 423/491

(58) Field of Classification Search
None
See application file for complete search history.

(56) References Cited

To view the complete listing of prior art documents cited during the proceeding for Reexamination Control Number 95/001,368, please refer to the USPTO's public Patent Application Information Retrieval (PAIR) system under the Display References tab.

*Primary Examiner* — Alan Diamond

(57) ABSTRACT

A method of treating a coal combustion flue gas, which includes injecting a molecular halogen or thermolabile molecular halogen precursor, such as calcium hypochlorite, able to decompose to form molecular halogen at flue gas temperature. The molecular halogen converts elemental mercury to mercuric halide, which is adsorbable by alkaline solids such as subbituminous or lignite coal ash, alkali fused bituminous coal ash, and dry flue gas desulphurization solids, capturable in whole or part by electrostatic precipitators (ESPs), baghouses (BHs), and fabric filters (FFs), with or without subsequent adsorption by a liquid such as a flue gas desulphurization scrubbing liquor.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 9, before line 64:

*Statement 1. The invention comprises a method of treating coal combustion flue gas containing mercury, comprising: injecting one of molecular halogen and a thermolabile molecular halogen precursor into said flue gas to effect oxidation of elemental mercury to a mercuric halide and providing alkaline solid particles in said flue gas ahead of a particulate collection device, in order to adsorb at least a portion of said mercuric halide.*

*Statement 2. The method of Statement 1, wherein said molecular halogen and/or thermolabile molecular halogen precursor contains a member selected from the group consisting of chlorine, bromine and iodine.*

*Statement 3. The invention comprises the method of Statement 2, wherein said thermolabile molecular halogen precursor contains a hypohalite.*

*Statement 4. The invention comprises the method of Statement 3, wherein said hypohalite is a hypochlorite.*

*Statement 5. The invention comprises the method of Statement 4, wherein said hypochlorite is calcium hypochlorite.*

*Statement 6. The invention comprises the method of Statement 5, wherein the calcium hypochlorite is in aqueous solution.*

*Statement 7. The invention comprises the method of Statement 6, wherein calcium chloride is a component of the calcium hypochlorite containing solution.*

*Statement 8. The invention comprises the method of Statement 1, wherein the alkaline solid particles are alkaline coal fly ash particles.*

*Statement 9. The invention comprises the method of Statement 8, wherein the coal fly ash particles are those derived from combustion of subbituminous or lignite coal.*

*Statement 10. The invention comprises the method of Statement 1, wherein the alkaline solid particles are those derived from the fusion of coal ash with alkali and an alkali flux.*

*Statement 11. The invention comprises the method of Statement 1, wherein the alkaline solid particles are those derived from the decomposition of a thermolabile halogen precursor.*

*Statement 12. The invention comprises the method of Statement 1, wherein the alkaline solid particles are those derived from flue gas desulphurization solids.*

*Statement 13. The invention comprises the method of Statement 1, wherein the resulting treated flue gas containing alkaline solid particles is passed through an electrostatic precipitator.*

*Statement 14. The invention comprises the method of Statement 1, wherein the resulting treated flue gas containing alkaline solid particles is passed through a baghouse.*

*Statement 15. The invention comprises the method of Statement 1, wherein the resulting treated flue gas containing alkaline solid particles is passed through a fabric filter.*

*Statement 16. The invention comprises the method of Statement 1, wherein the resulting treated flue gas is passed through a flue gas desulphurization system (FGD) containing a liquid.*

*Statement 17. The invention comprises the method of Statement 11, wherein the alkaline particles contain lime.*

*Statement 18. The invention comprises the method of Statement 1, wherein the mercuric halide containing alkaline solid particles are suitable for use in cementitious products.*

AS A RESULT OF REEXAMINATION, IT HAS BEEN DETERMINED THAT:

Claims 2-7 are cancelled.

Claims 1, 11 and 18 are determined to be patentable as amended.

Claims 8-10 and 12-17, dependent on an amended claim, are determined to be patentable.

New claims 19-29 are added and determined to be patentable.

1. A method of treating coal combustion flue gas containing mercury, comprising:
  injecting a [member selected from the group consisting of molecular halogen and a] *bromide compound that is a* thermolabile molecular [halogen] *bromine* precursor into said flue gas to effect oxidation of elemental mercury to a mercuric [halide] *bromide* and providing alkaline solid particles in said flue gas ahead of a particulate collection device, in order to adsorb at least a portion of said mercuric [halide] *bromide*.

11. A method as claimed in claim 1, wherein the alkaline solid particles are those derived from the decomposition of [a] *the* thermolabile molecular [halogen] *bromine* precursor.

18. The method as claimed in claim 1, wherein the mercuric [halide] *bromide* containing alkaline solid particles are suitable for use in cementitious products.

*19. A method of treating flue gas that contains elemental mercury, wherein the flue gas is produced during the combustion of coal, said method comprising the steps of:*
  *(a) injecting into the flue gas a bromide compound that is a thermolabile molecular bromine precursor selected from the group consisting of calcium compounds and magnesium compounds, whereby the elemental mercury is oxidized to form mercuric bromide; and*
  *(b) providing solid alkaline particles in said flue gas upstream of a particulate collection device, whereby at* least a portion of the mercuric bromide produced at Step (a) is adsorbed by the solid alkaline particles.

20. A method of treating flue gas that contains elemental mercury, wherein the flue gas is produced during the combustion of coal, said method comprising the steps of:
   (a) injecting into the flue gas a thermolabile molecular halogen precursor, whereby the elemental mercury is oxidized to form mercuric halide; and
   (b) providing solid alkaline particles in said flue gas upstream of a particulate collection device, whereby at least a portion of the mercuric halide produced at Step (a) is adsorbed by the solid alkaline particles;
   wherein the thermolabile molecular halogen precursor of Step (a) is magnesium bromide.

21. A method of treating flue gas that contains elemental mercury, wherein the flue gas is produced during the combustion of coal, said method comprising the steps of:
   (a) injecting into the flue gas a thermolabile molecular halogen precursor, whereby the elemental mercury is oxidized to form mercuric chloride; and
   (b) providing solid alkaline particles in said flue gas upstream of a particulate collection device, whereby at least a portion of the mercuric chloride produced at Step (a) is adsorbed by the solid alkaline particles;
   wherein the thermolabile molecular halogen precursor of Step (a) is a hypochlorite;
   wherein the hypochlorite is calcium hypochlorite; and
   wherein the calcium hypochlorite is in an aqueous solution containing calcium chloride.

22. The method of claim 19 wherein the alkaline solid particles provided at Step (b) are coal fly ash particles.

23. The method of claim 22 wherein the coal comprises at least one of subbituminous coal and lignite coal.

24. The method of claim 19 wherein the alkaline solid particles provided at Step (b) are derived from the fusion of coal ash with alkali and an alkali flux.

25. The method of claim 19 wherein the alkaline solid particles provided at Step (b) are derived from the decomposition of the thermolabile molecular bromine precursor of Step (a).

26. The method of claim 19 wherein the alkaline solid particles provided at Step (b) are derived from flue gas desulphurization (FGD) solids.

27. The method of claim 19, further comprising the step of: incorporating the solid alkaline particles collected at Step (b) into a cementitious product.

28. The method of claim 19, further comprising the step of: passing the flue gas through a flue gas desulphurization system (FGD) containing a liquid.

29. The method of claim 19 wherein the particulate collection device of Step (b) is chosen from the group consisting of: a) electrostatic precipitator; b) baghouse; and c) fabric filter.

* * * * *